(12) United States Patent
Assmann

(10) Patent No.: US 7,497,520 B2
(45) Date of Patent: Mar. 3, 2009

(54) FITTING FOR A VEHICLE SEAT

(75) Inventor: Uwe Assmann, Remscheid (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 111 days.

(21) Appl. No.: 11/582,054

(22) Filed: Oct. 16, 2006

(65) Prior Publication Data

US 2007/0035168 A1  Feb. 15, 2007

Related U.S. Application Data

(63) Continuation of application No. PCT/EP2005/003761, filed on Apr. 9, 2005.

(30) Foreign Application Priority Data

Apr. 17, 2004  (DE) .................... 10 2004 018 744

(51) Int. Cl.
*B60N 2/235* (2006.01)

(52) U.S. Cl. .................... 297/367; 297/362; 297/463.2

(58) Field of Classification Search ................ 297/362, 297/367, 463.2; 29/525.14
See application file for complete search history.

(56) References Cited

U.S. PATENT DOCUMENTS

| 5,573,345 | A | | 11/1996 | Voss et al. |
| 5,927,893 | A | * | 7/1999 | Imamura et al. ............ 403/270 |
| 6,010,191 | A | | 1/2000 | Calinaud et al. |
| 6,060,682 | A | * | 5/2000 | Westbroek et al. ..... 219/121.64 |
| 6,536,090 | B1 | * | 3/2003 | Franklin et al. ................ 29/458 |
| 6,640,414 | B2 | * | 11/2003 | Stevenson et al. ......... 29/525.14 |
| 6,688,000 | B2 | * | 2/2004 | Wang et al. ................. 29/897.2 |
| 6,799,806 | B2 | | 10/2004 | Eppert et al. |
| 6,949,154 | B2 | * | 9/2005 | Hochrainer et al. ........... 156/69 |
| 7,278,689 | B2 | * | 10/2007 | Guillouet .................... 297/362 |
| 2002/0043521 | A1 | | 4/2002 | Klein et al. |
| 2003/0029558 | A1 | * | 2/2003 | Hochrainer et al. ...... 156/272.8 |
| 2003/0067205 | A1 | | 4/2003 | Eppert et al. |
| 2004/0118818 | A1 | * | 6/2004 | Oda et al. ............. 219/121.64 |
| 2006/0220430 | A1 | * | 10/2006 | Baloche Faurecia ........ 297/362 |

FOREIGN PATENT DOCUMENTS

| DE | 43 39 508 A1 | 5/1994 |
| DE | 44 16 283 A1 | 11/1995 |
| DE | 198 13 517 A1 | 10/1998 |
| DE | 101 05 282 A1 | 8/2002 |

* cited by examiner

*Primary Examiner*—David Dunn
*Assistant Examiner*—James Alex
(74) *Attorney, Agent, or Firm*—Womble Carlyle Sandridge & Rice, PLLC

(57) ABSTRACT

In a fitting (5) for a vehicle seat, in particular for a motor vehicle seat, having a first fitting part (11), having a second fitting part (12) which can be rotated relative to the first fitting part (11), having a ring (35) which holds the two fitting parts (11, 12) together in the axial direction and whose contact surface with the first fitting part (11) defines a baseline (47), and having a first adapter (41), the first fitting part (11), the ring (35) and the first adapter (41) are firmly connected to one another by way of at least one common weld seam (45) extending in their material, and the weld seam (45) is arranged, sectionwise, on different sides of the baseline (47).

25 Claims, 1 Drawing Sheet

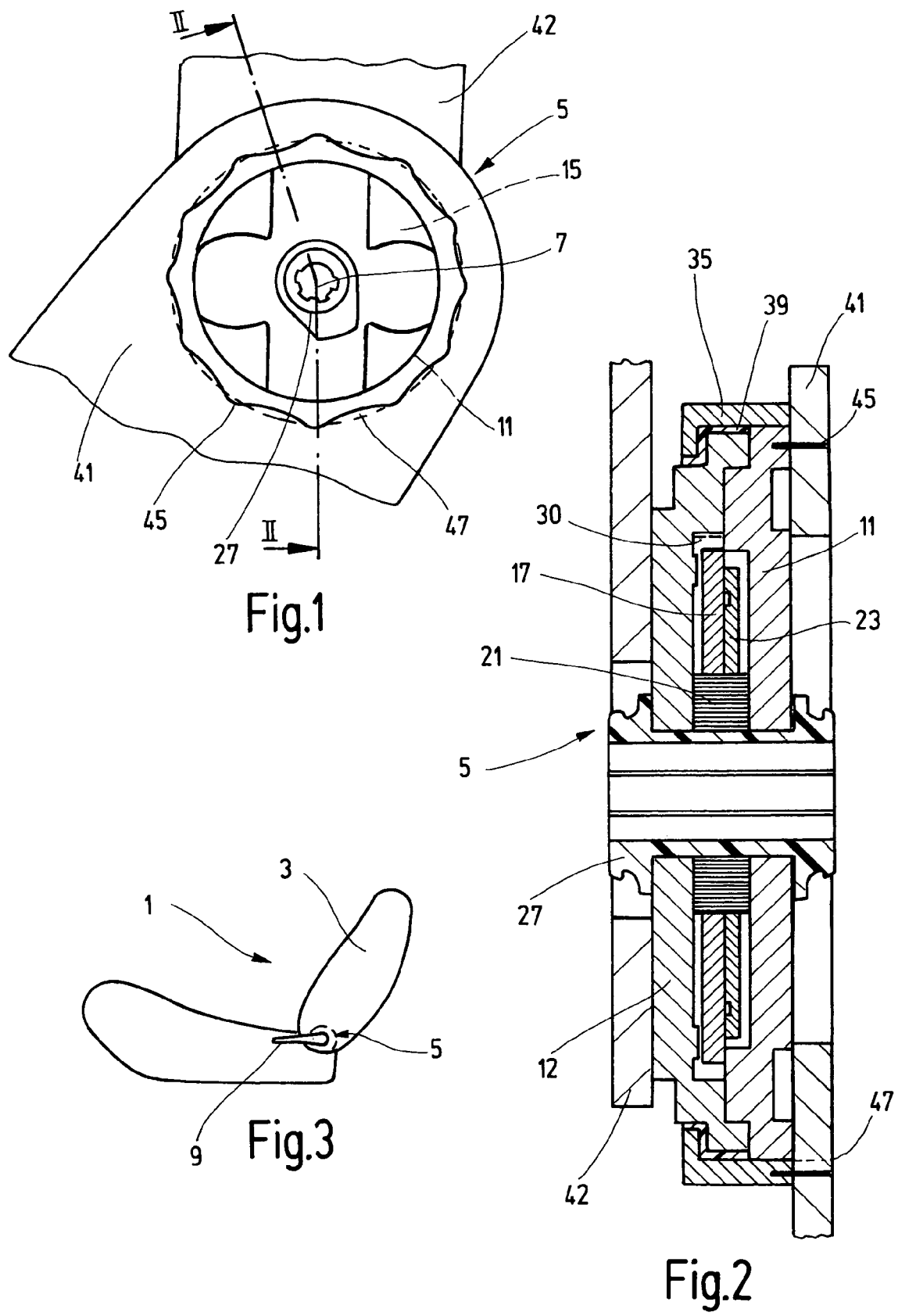

US 7,497,520 B2

FITTING FOR A VEHICLE SEAT

CROSS-REFERENCE TO RELATED APPLICATION

The present application is a continuation of International Application PCT/EP2005/003761, which was filed Apr. 9, 2005. The entire disclosure of PCT/EP2005/003761 is incorporated herein by reference.

BACKGROUND OF THE INVENTION

The present invention relates to a fitting for a vehicle seat, in particular for a motor vehicle seat, having a first fitting part; a second fitting part that is rotatable relative to the first fitting part; a ring which holds the two fitting parts together in the axial direction and whose contact surface with the first fitting part defines a baseline; and a first adapter, wherein the first fitting part, the ring and the first adapter are firmly connected to one another by at least one common weld seam extending in their material.

A fitting of the type described above is known from DE 101 05 282 A1, which discloses that the fitting is provided as an inclination adjuster for the backrest of a motor vehicle seat. The first fitting part is pressed into the ring, and the ring reaches over the second fitting part. A weld seam is applied through the first adapter and extends along the base line, simultaneously connecting the first fitting part, the ring and the first adapter. The fitting is attached to the structure of the vehicle seat during final assembly by means of the adapters, which are adapted for being attached to the structure of the vehicle seat.

BRIEF SUMMARY OF SOME ASPECTS OF THE INVENTION

An aspect of the present invention is the provision of improvements to a fitting of the type described above, in particular with the improvements relating to production. In accordance with one aspect of the present invention, a fitting for a vehicle seat, in particular for a motor vehicle seat, includes a first fitting part, a second fitting part, a ring and a first adapter. The ring holds the first fitting part and the second fitting part together in an axial direction such that the second fitting part can be rotated relative to the first fitting part. The ring includes a surface that contacts the first fitting part and defines a baseline. The first fitting part, the ring and the adapter are firmly connected to one another by sections of at least one weld seam. The sections include at least a first section and a second section that are positioned on opposite sides of the baseline from one another, and that extend in at least two of the first fitting part, the ring and the adapter.

Because the weld seam is arranged sectionwise on different sides of the baseline, higher tolerances are allowable during the positioning of the components, without impairing the connection. The higher tolerances allow a less precise and thus a more cost- efficient production and pre-positioning of the individual components. Having sections of the weld seam that extend on different sides of the baseline is achieved without any significant additional costs. The weld seam extends such that it preferably oscillates across the baseline, i.e. seen in the circumferential direction of the baseline as a continually alternating from one side to the other, preferably with no undercuts, which allows a simplified production with a unidirectional feed in the circumferential direction. The alternation caused by the oscillating preferably happens several times along the circumference, e.g. a dozen times.

For a simplified production of the weld seam, sections of it preferably extend in the material of the first fitting part and other sections of it extend in the material of the ring, with the weld seam preferably extending continuously in the material of the first adapter. The weld seam may be formed in the circumferential direction of the fitting as encircling and continuous, or it may have individual sections separate from one another, each crossing the baseline at least once or being alternately arranged on either side of the baseline. In the case of individual sections following a hypothetical oscillating course, multiple connections of the three components in small areas are ensured. In a preferred embodiment the baseline extends in the form of a ring, i.e. as a circular line, with the weld seam oscillating periodically across the baseline; however, other symmetries or an asymmetrical course is possible.

For weld connections, laser welding is preferred, because in this case the weld seam can be formed specifically and without additions. In this case, laser welding is preferably done from the same direction from which the respective adapter is attached, i.e. as a rule, through the respective adapter. Another option is, instead of using a specially formed adapter, e.g. that adapter which is assigned to the second fitting part, to attach the respective fitting part directly to the structure, so that for the teaching, if necessary, the structure part in question replaces the separate adapter. Thus the term "adapter", in the sense according to the invention, shall also include, apart from separately formed adapters, material parts formed onto structure parts (e.g., of the vehicle seat), or the structure parts themselves.

The fitting is used as an adjuster in a vehicle seat, for example as an inclination adjuster for the backrest and/or an inclination adjuster for the seat cushion and/or for driving a height adjuster.

Other aspects and advantages of the present invention will become apparent from the following.

BRIEF DESCRIPTION OF THE DRAWINGS

The invention is explained in more detail below with reference to an exemplary embodiment illustrated in the drawings and a modification thereof. In the drawings:

FIG. 1 is a view of an exemplary embodiment,
FIG. 2 is a section along the line II-II in FIG. 1, and
FIG. 3 is a schematically represented vehicle seat.

DETAILED DESCRIPTION OF EXEMPLARY EMBODIMENT

For adjusting the inclination of its backrest 3, a vehicle seat 1 for a motor vehicle has, on both of its sides, a respective fitting 5 which is designed as a detent fitting, but could also be designed as a gear fitting. The two fittings 5 are in geared connection with each other by means of a transmission rod 7. A hand lever 9, which sits in a rotationally fixed manner on the transmission rod 7, is used for the manual actuation of the fittings 5. The following directional details refer to the cylindrical coordinate system that is defined by the transmission rod 7, which is arranged horizontally and transversely to the direction of travel.

The construction of fitting 5 resembles that of DE 101 05 282 A1, the entire disclosure of which is expressly incorporated herein by reference. Each fitting 5 has an approximately disc-shaped lower fitting part 11 and a likewise approximately disc-shaped upper fitting part 12. By means of four guiding and bearing segments 15, the first fitting part 11, which is fixed to the seat structure after final assembly, guides two toothed segments 17, which are pressed radially outwards by a spring loaded eccentric 21 and are pulled radially inwards again by means of a drive disc 23. The eccentric 21 sits on a plastic transmission element 27 which, in turn, sits in a rotationally fixed manner on the transmission rod 7. The second fitting part 12, formed as a hollow wheel with a gear ring 30 on the inside, is supported on the external surfaces of the guiding and bearing segment 15. The gear ring 30 of the second fitting part 12 cooperates with the toothed segments 17 for locking the fitting 5. In an unlocked state, the second fitting part 12 is pivotable relative to the first fitting part 11, i.e. by 360° before installation in the vehicle seat 1.

If the fitting 5 were formed as a self-locking gear fitting, the second fitting part 12 would be of almost identical form; however, a sprocket would be formed on the first fitting part 11, executing—driven by an eccentric pivotable relative to it—a roll-along movement on the gear ring 30 of the second fitting part 12, which would occur as a rotating movement with a superimposed wobble movement.

A clasp ring, hereinafter in short form called ring 35, is arranged on both the circumferential surface of the first fitting part 11 that is facing radially outwards and the circumferential surface of the second fitting part 12 that is facing radially outwards. The first fitting part 11 is firmly pressed into (e.g., press-fit into) the ring 35. For holding the two fitting parts 11 and 12 together in the axial direction, the ring 35, with a crimped edge, reaches radially over the second fitting part 12. For damping and tolerance equalization with given play, an intermediate ring 39 is preferably provided between the second fitting part 12 and the ring 35. In this state, the fitting 5 is transportable.

For later use of the fitting 5, a first adapter 41 and a second adapter 42 are mounted on the fitting 5. The second adapter 42, which is provided for/adapted for the purpose of attachment to the backrest 3, is mounted by laser welding to the second fitting part 12 on the front end facing away from the first fitting part 11 in an axial direction. The first adapter 41, which is provided for/adapted for the purpose of attachment to the seat part, is applied against the first fitting part 11 on the side facing away from the second fitting part 12 in an axial direction, entirely covering the first fitting part 11 except for a central opening. However, it is also possible for the adapter 41 to have a larger opening of the diameter of the first fitting part 11, with the adapter 41 receiving the first fitting part 11 with said opening while coming to bear on a step formed by the ring 35.

An encircling connecting (laser) weld seam 45, coming from the axial direction, is formed through the material of the first adapter 41, the first fitting part 11, and the ring 35, i.e. as a piercing seam, so that these three components are firmly connected through one welding process. Starting from a (circular) annular baseline 47 which is defined by the contact surface of the ring 35 with the fitting part 11, the weld seam 45 oscillates across this baseline 47 in a radial direction; i.e. seen in an axial direction, it has a wave form, whereas, seen in the circumferential direction, it oscillates. Usually, i.e. when it is continuous, the weld seam 45 thus extends not only continuously in the material of the first adapter 41, but also, sectionwise, in the material of the first fitting part 11 and again, sectionwise, in the material of the ring 35, with the baseline 47 being crossed several times. The three mentioned components (first fitting part 11, ring 35, first adapter 41) are thus connected with one another by means of one weld seam 45. In a modified form, the weld seam 45 is not formed in a continuous manner, but only consists of individual sections separate from one another, e.g. the sections crossing the baseline 47, with the three components still being connected with one another. The oscillating of the weld seam 45 is periodical, i.e. with a certain symmetry; however, in this case deviating from a sine curve.

It will be understood by those skilled in the art that while the present invention has been discussed above with reference to an exemplary embodiment, various additions, modifications and changes can be made thereto without departing from the spirit and scope of the invention as set forth in the following claims.

What is claim is:

1. A fitting for a vehicle seat, the fitting comprising:
   a first fitting part;
   a second fitting part;
   a ring that holds the first fitting part and the second fitting part together in an axial direction such that the second fitting part can be rotated about an axis relative to the first fitting part, wherein the axis extends in the axial direction, a surface of the ring that contacts the first fitting part defines a baseline, and the baseline extends around the axis; and
   a first adapter, wherein
   the first fitting part, the ring and the adapter are firmly connected to one another by sections of at least one weld seam,
   the weld seam oscillates radially across the baseline,
   the sections include at least a first section and a second section that are positioned on opposite sides of the baseline from one another,
   the first section extends in material of at least two components selected from the group consisting of the first fitting part, the ring and the adapter, and
   the second section extends in material of at least two components selected from the group consisting of the first fitting part, the ring and the adapter.

2. The fitting according to claim 1, wherein:
   the first section extends in the material of the first fitting part, and
   the second section extends in the material of the ring.

3. The fitting according to claim 1, wherein weld seam extends continuously in the material of the first adapter.

4. The fitting according to claim 1, wherein the weld seam is continuous and closed in the fitting's circumferential direction.

5. The fitting according to claim 1, wherein the sections are individual sections that are separate from one another.

6. The fitting according to claim 1, wherein the baseline is ring-shaped.

7. The fitting according to claim 1, wherein the weld seam periodically oscillates radially across the baseline.

8. The fitting according to claim 1, wherein the weld seam is formed by laser welding from a side of the fitting that faces away from the second fitting part.

9. The fitting according to claim 1, wherein the first adapter is for attaching the fitting to structure of the vehicle seat.

10. The fitting of claim 1 in combination with the vehicle seat, wherein the vehicle seat includes a backrest, and the fitting is operatively connected to the backrest for adjusting the backrest's inclination.

11. The fitting according to claim 1, wherein in a cross-section that extends in the axial direction through each of the axis, the first fitting part, the second fitting part, the first adapter, the baseline and the ring:
    the cross-section includes a first portion that extends radially from a first side of the axis and through each of the first fitting part, the second fitting part, the first adapter, the baseline and the ring,
    the cross-section includes a second portion that extends radially from a second side of the axis and through each of the first fitting part, the second fitting part, the first adapter, the baseline and the ring, in the first portion of the cross-section
- (a) the first section extends in the material of the first fitting part, and
- (b) the weld seam does not extend in the material of the ring, and in the second portion of the cross-section, the second section extends in the material of the ring.

12. The fitting according to claim 11, wherein weld seam extends continuously in the material of the first adapter.

13. The fitting according to claim 2, wherein weld seam extends continuously in the material of the first adapter.

14. The fitting according to claim 11, wherein the weld seam is continuous and closed in the fitting's circumferential direction.

15. The fitting according to claim 2, wherein the weld seam is continuous and closed in the fitting's circumferential direction.

16. The fitting according to claim 5, wherein the individual sections cross the baseline at least once.

17. The fitting according to claim 5, wherein the individual sections are arranged alternately on either side of the baseline.

18. The fitting according to claim 2, wherein:
the first section also extends in the material of the first adapter, and
the second section also extends in the material of the first adapter.

19. The fitting according to claim 18, wherein
the first section does not extend in the material of the ring, and
the second section does not extend in the material of the first fitting part.

20. The fitting according to claim 1, wherein:
the weld seam extends at least partially around the axis;
with reference to the axis, the weld seam has radially opposite inner and outer sides;
the inner side of the weld seam is positioned between the outer side of the weld seam and the axis;
the inner side of the weld seam oscillates radially across the baseline so that radial distances between the inner side of the weld seam and the axis vary in an alternating manner, and
the outer side of the weld seam oscillates radially across the baseline so that radial distances between the outer side of the weld seam and the axis vary in an alternating manner.

21. The fitting according to claim 1, wherein in a cross-section that extends in the axial direction and extends through each of the axis, the first fitting part, the second fitting part, the first adapter, the baseline and the ring:
the cross-section includes a first portion that extends in a first radial direction from a first side of the axis and through each of the first fitting part, the second fitting part, the first adapter, the baseline and the ring,
the cross-section includes a second portion that extends in a second radial direction from a second side of the axis and through each of the first fitting part, the second fitting part, the first adapter, the baseline and the ring,
in the first portion of the cross-section, the first section extends in the material of the first fitting part, and
in the second portion of the cross-section
- (a) the second section extends in the material of the ring, and
- (b) the weld seam does not extend in the material of the first fitting part.

22. The fitting according to claim 21, wherein in the first portion of the cross-section, the weld seam does not extend in the material of the ring.

23. A fitting for a vehicle seat, the fitting comprising:
a first fitting part;
a second fitting part;
a ring that holds the first fitting part and the second fitting part together in an axial direction such that the second fitting part can be rotated about an axis relative to the first fitting part, wherein the axis extends in the axial direction, and a surface of the ring that contacts the first fitting part defines a baseline, and the baseline extends around the axis;
a first adapter;
the first fitting part, the ring and the adapter being firmly connected to one another by at least one weld seam; and
the weld seam simultaneously extending at least partially around the axis and oscillating radially across the baseline a plurality of times so that
- (a) in a first portion of an axially extending cross-section that extends in a first radial direction from a first side of the axis and through each of the first fitting part, the second fitting part, the first adapter, the baseline and the ring, the weld seam extends into both the first adapter and the ring, and
- (b) in a second portion of the axially extending cross-section that extends in a second radial direction from a second side of the axis and through each of the first fitting part, the second fitting part, the first adapter, the baseline and the ring,
    - (1) the weld seam extends into both the first fitting part and the first adapter, and
    - (2) the weld seam does not extend into the ring.

24. The fitting according to claim 23, wherein the weld seam does not extend into the first fitting part in the first portion of the axially extending cross-section.

25. A fitting for a vehicle seat, the fitting comprising:
a first fitting part;
a second fitting part;
a ring that holds the first fitting part and the second fitting part together in an axial direction such that the second fitting part can be rotated about an axis relative to the first fitting part, wherein the axis extends in the axial direction, and a surface of the ring that contacts the first fitting part defines a baseline, and the baseline extends around the axis;
a first adapter;
the first fitting part, the ring and the adapter being firmly connected to one another by at least one weld seam; and
the weld seam simultaneously extending at least partially around the axis and oscillating radially across the baseline a plurality of times so that
- (a) in a first portion of an axially extending cross-section that extends in a first radial direction from a first side of the axis and through each of the first fitting part, the second fitting part, the first adapter, the baseline and the ring, the weld seam extends into both the first fitting part and the first adapter, and
- (b) in a second portion of the axially extending cross-section that extends in a second radial direction from a second side of the axis and through each of the first fitting part, the second fitting part, the first adapter, the baseline and the ring,
    - (1) the weld seam extends into both the first adapter and the ring, and
    - (2) the weld seam does not extend into the first fitting part.

* * * * *